United States Patent [19]
Jensen

[11] Patent Number: 5,845,879
[45] Date of Patent: Dec. 8, 1998

[54] INFLATABLE CONFORMABLE FUEL TANK

[75] Inventor: Duane Lowell Jensen, Byron, Calif.

[73] Assignee: Lockheed Martin Corporation, Sunnyvale, Calif.

[21] Appl. No.: 579,742

[22] Filed: Dec. 28, 1995

[51] Int. Cl.⁶ .................................................. B64D 37/02
[52] U.S. Cl. ................... 244/135 R; 244/135 B; 244/130; 244/219; 92/35; 220/720
[58] Field of Search .................... 244/219, 130, 244/135 R, 135 C, 135 B, 134 A, 128; 92/92, 35; 220/562, 563, 720, 721, 905; 52/2.22, 2.19; 440/16

[56] References Cited

U.S. PATENT DOCUMENTS

| | | | |
|---|---|---|---|
| 2,094,619 | 10/1937 | Reichert et al. | 244/128 |
| 2,404,418 | 7/1946 | Walker | 244/135 B |
| 2,764,950 | 10/1956 | Finnel | 220/720 |
| 3,094,733 | 6/1963 | Mandy | 92/35 |
| 3,209,719 | 10/1965 | Christopher | 440/16 |
| 3,284,964 | 11/1966 | Saito | 52/2.22 |
| 3,447,768 | 6/1969 | Mcqueen | 244/219 |
| 3,612,344 | 10/1971 | Stuart | 220/720 |
| 3,973,363 | 8/1976 | Laporte et al. | 52/2.19 |
| 4,026,503 | 5/1977 | Rhodes | 244/135 B |
| 4,214,721 | 7/1980 | Burhans, Jr. et al. | 244/135 B |
| 4,360,124 | 11/1982 | Knaus et al. | 244/135 B |
| 4,715,417 | 12/1987 | Coloney | 244/135 B |
| 5,160,102 | 11/1992 | Hlavac | 244/134 A |

FOREIGN PATENT DOCUMENTS 2378430 9/1978 France .................................. 244/219

*Primary Examiner*—Galen L. Barefoot
*Attorney, Agent, or Firm*—Feix & Feix

[57] ABSTRACT

The invention discloses a deployable, inflatable conformable fuel tank assembly constructed to be installed at a certain location on an aircraft and to be retained at that certain location throughout the entire flight operation of the aircraft. The fuel tank assembly is constructed to be movable between a first, deployed aerodynamic configuration in which the assembly can hold a supply of liquid fuel, and a second, stowed aerodynamic configuration in which the exterior surface of the assembly conforms to a surface of the aircraft underlying the assembly. The fuel tank assembly is fabricated from flexible and foldable fiber-reinforced membrane material and includes a first, inner, liquid chamber for containing a supply of liquid fuel and a second, outer, gas chamber which at least partially envelopes the liquid chamber and which is constructed to contain a pressurized volume of gas sufficient to maintain the fuel tank assembly in the first, aerodynamic deployed configuration irrespective of the quantity of fuel in said first, inner, liquid chamber. Upon depletion of the fuel in the inner, liquid chamber, the pressurized gas in the outer, gas chamber can be evacuated in order to cause the fuel tank assembly to move into the stowed aerodynamic configuration.

15 Claims, 9 Drawing Sheets

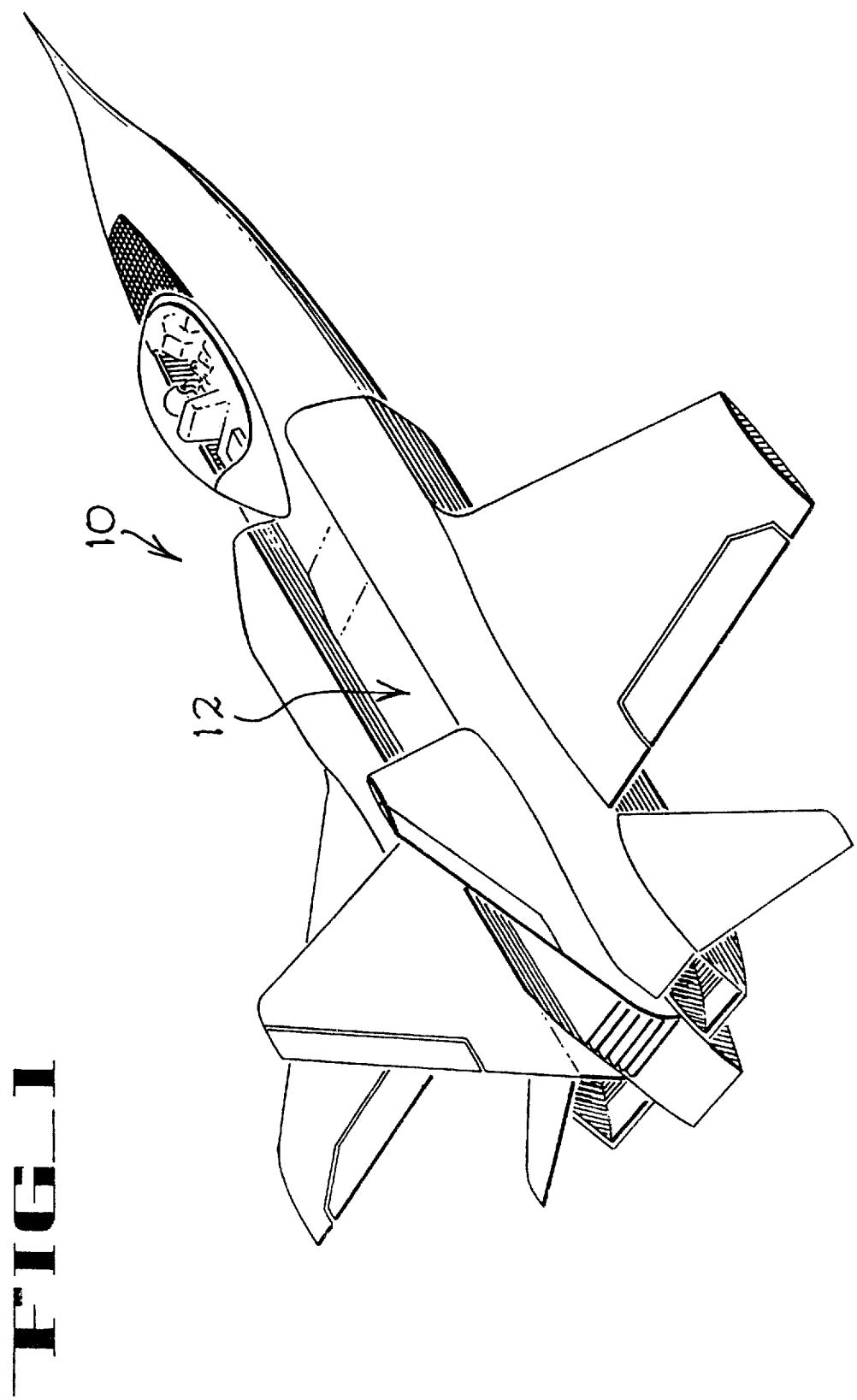
FIG_1

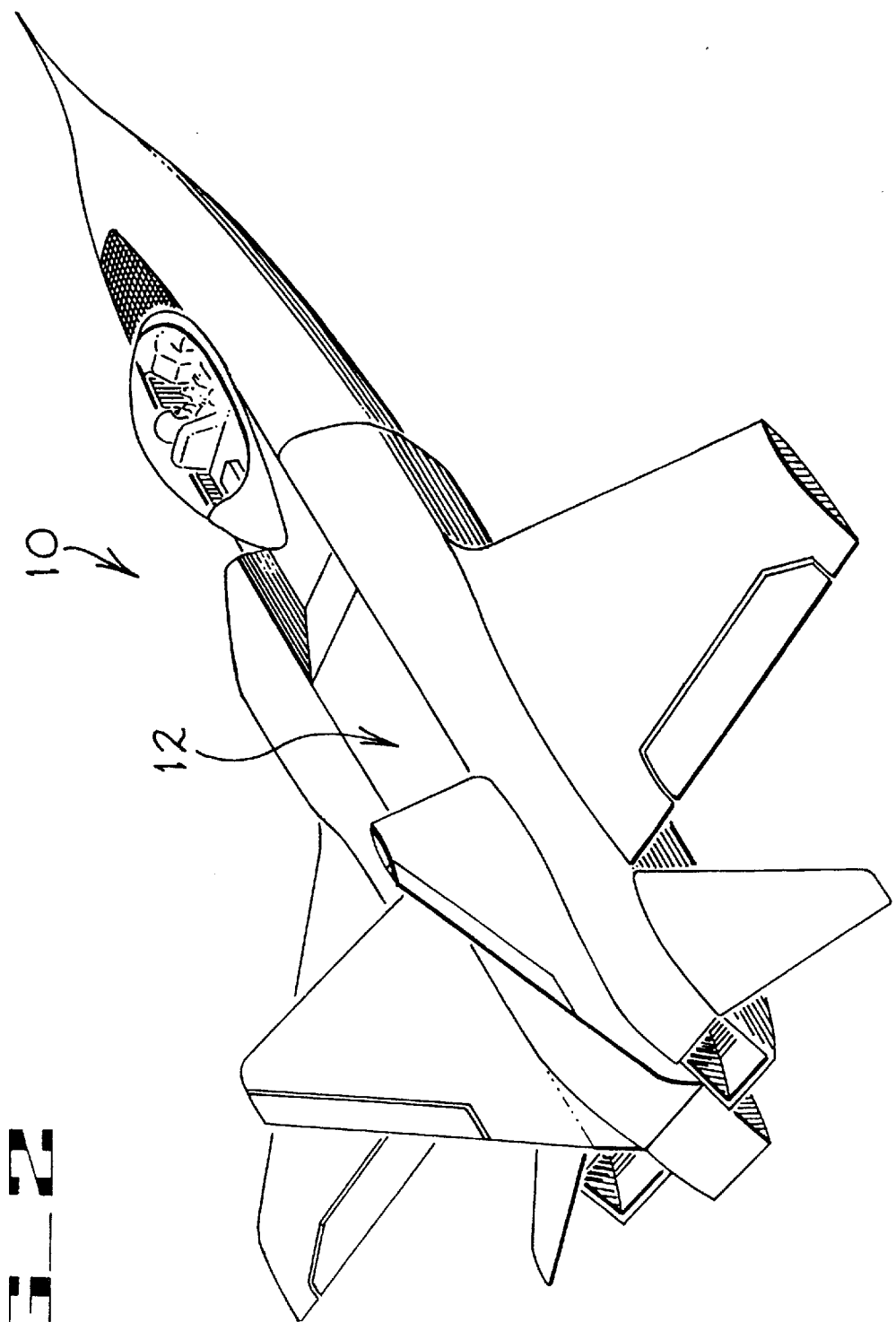
FIG_2

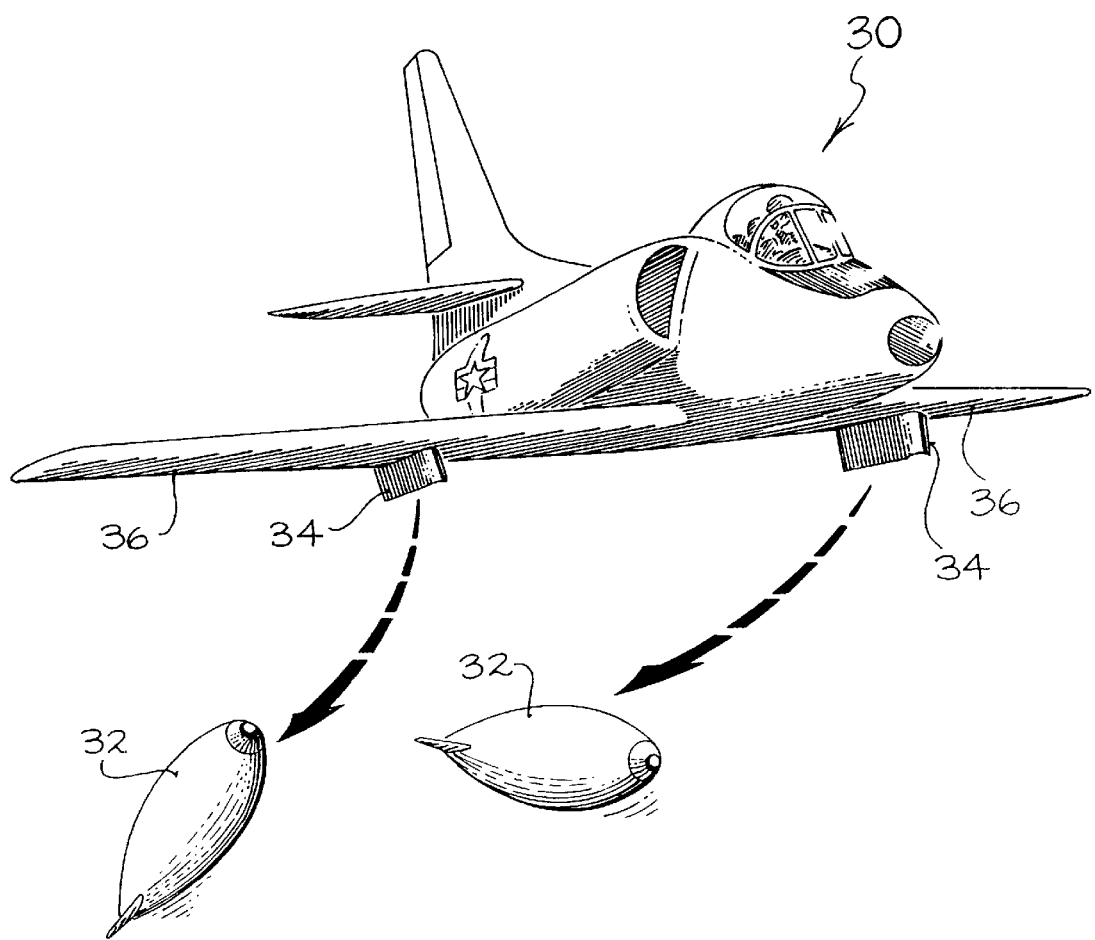
FIG_3
PRIOR ART

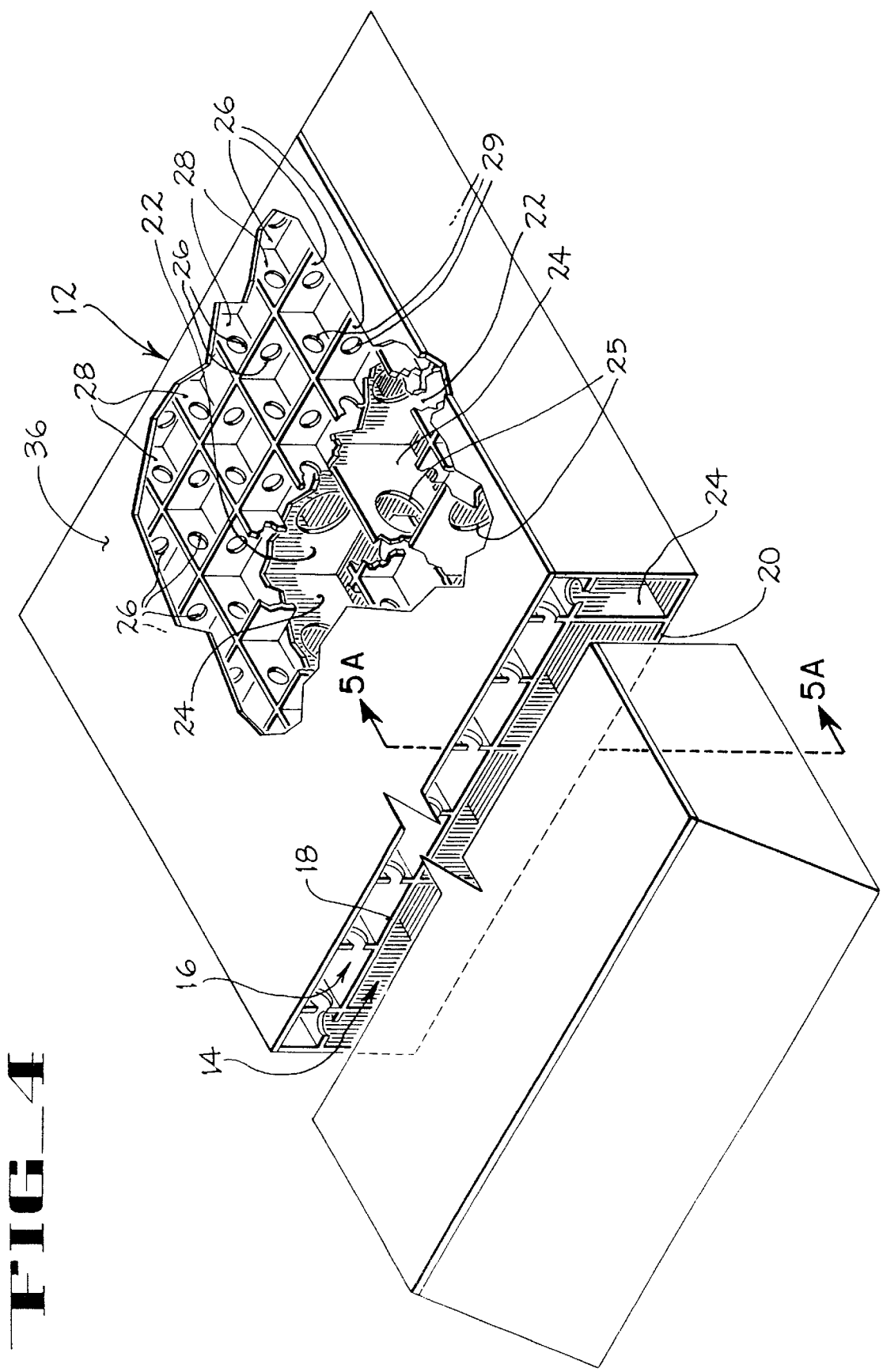
FIG_4

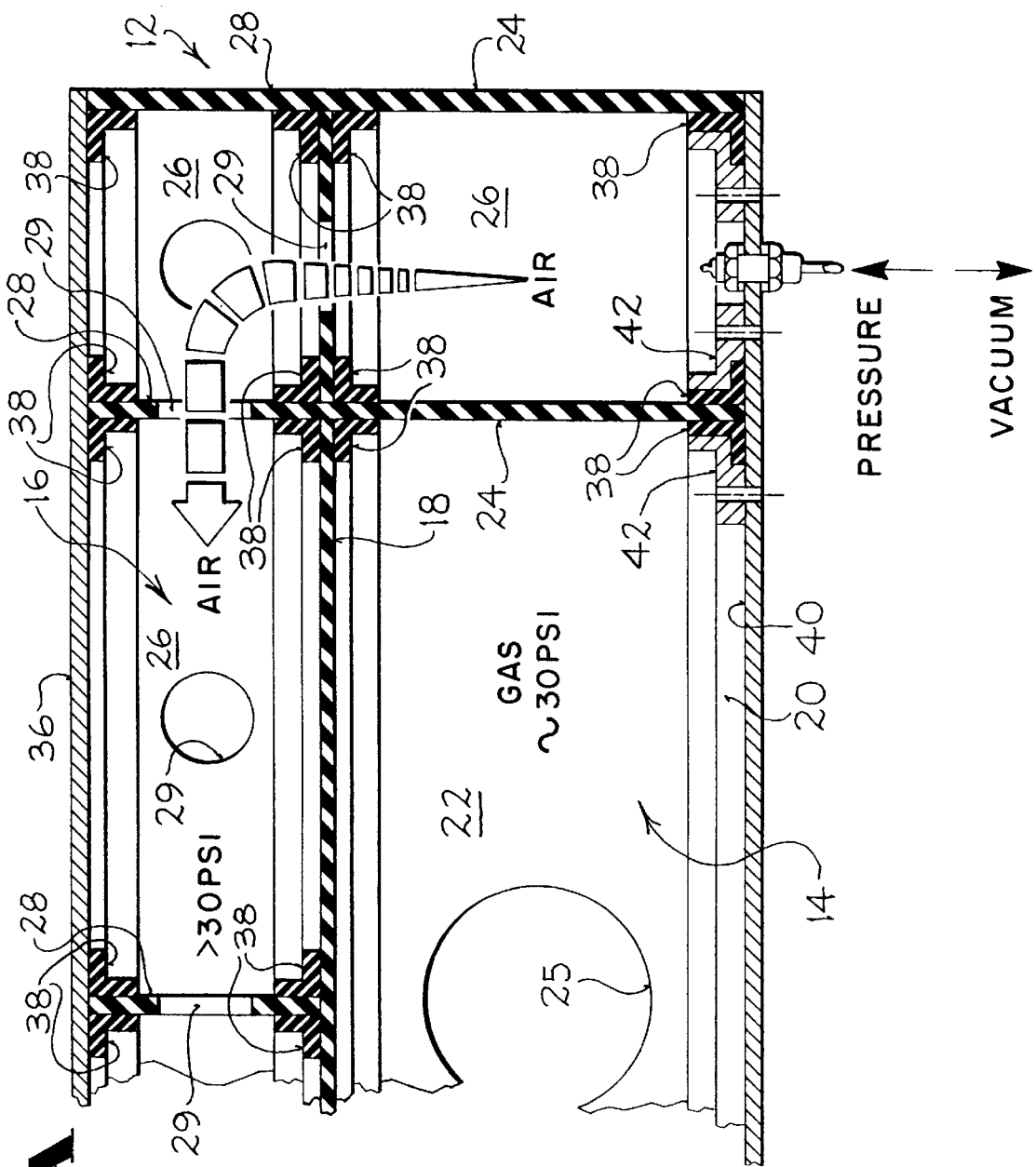

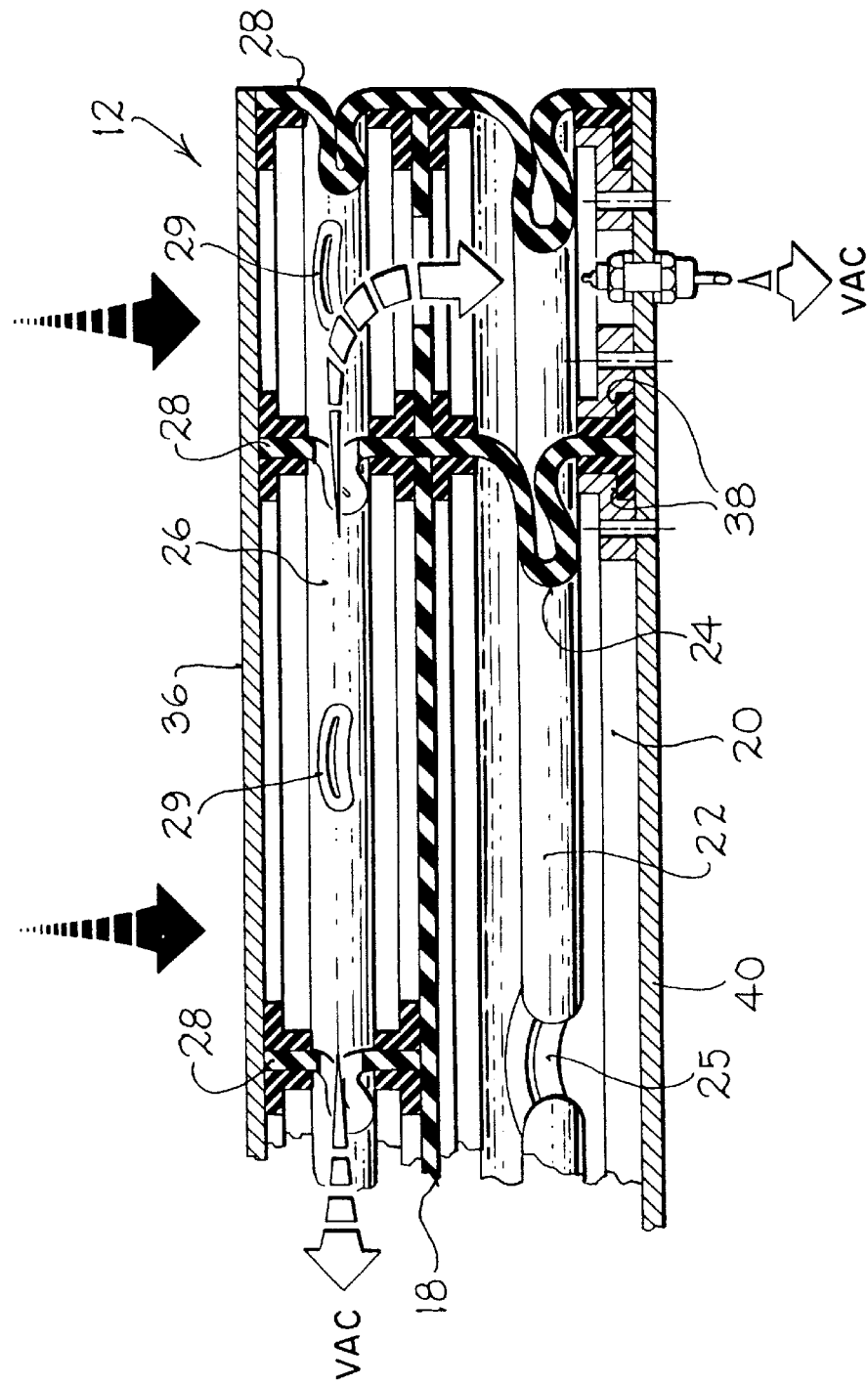

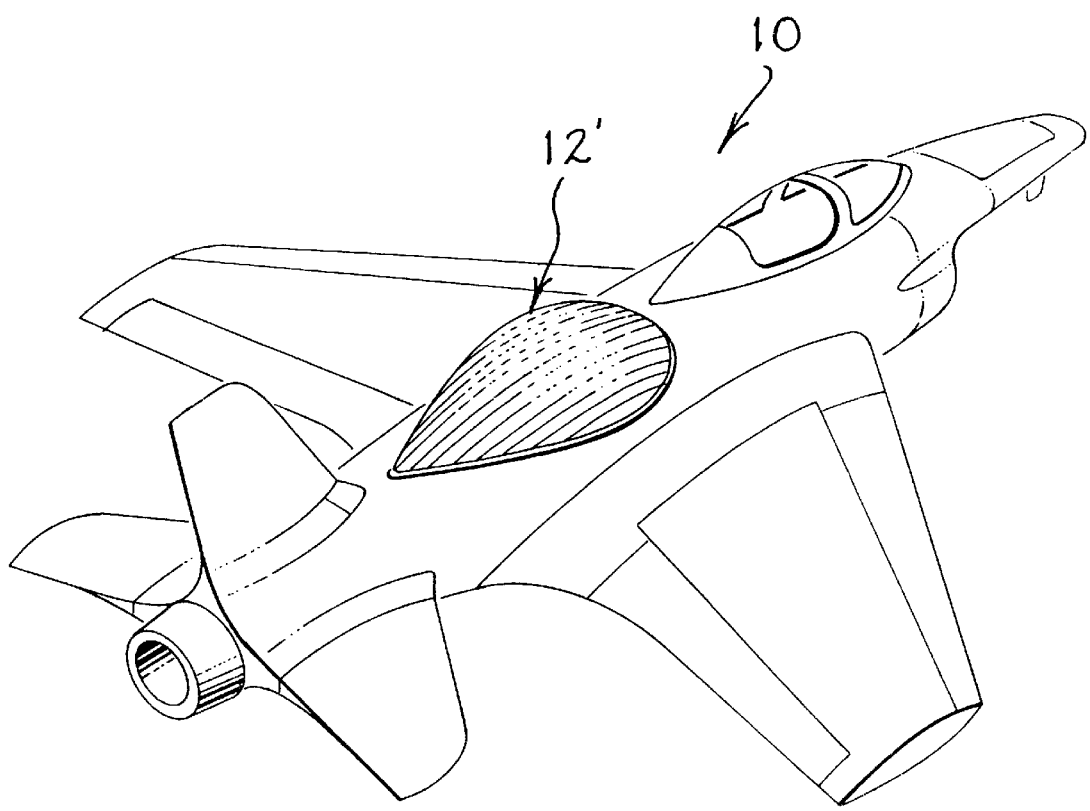
FIG_6

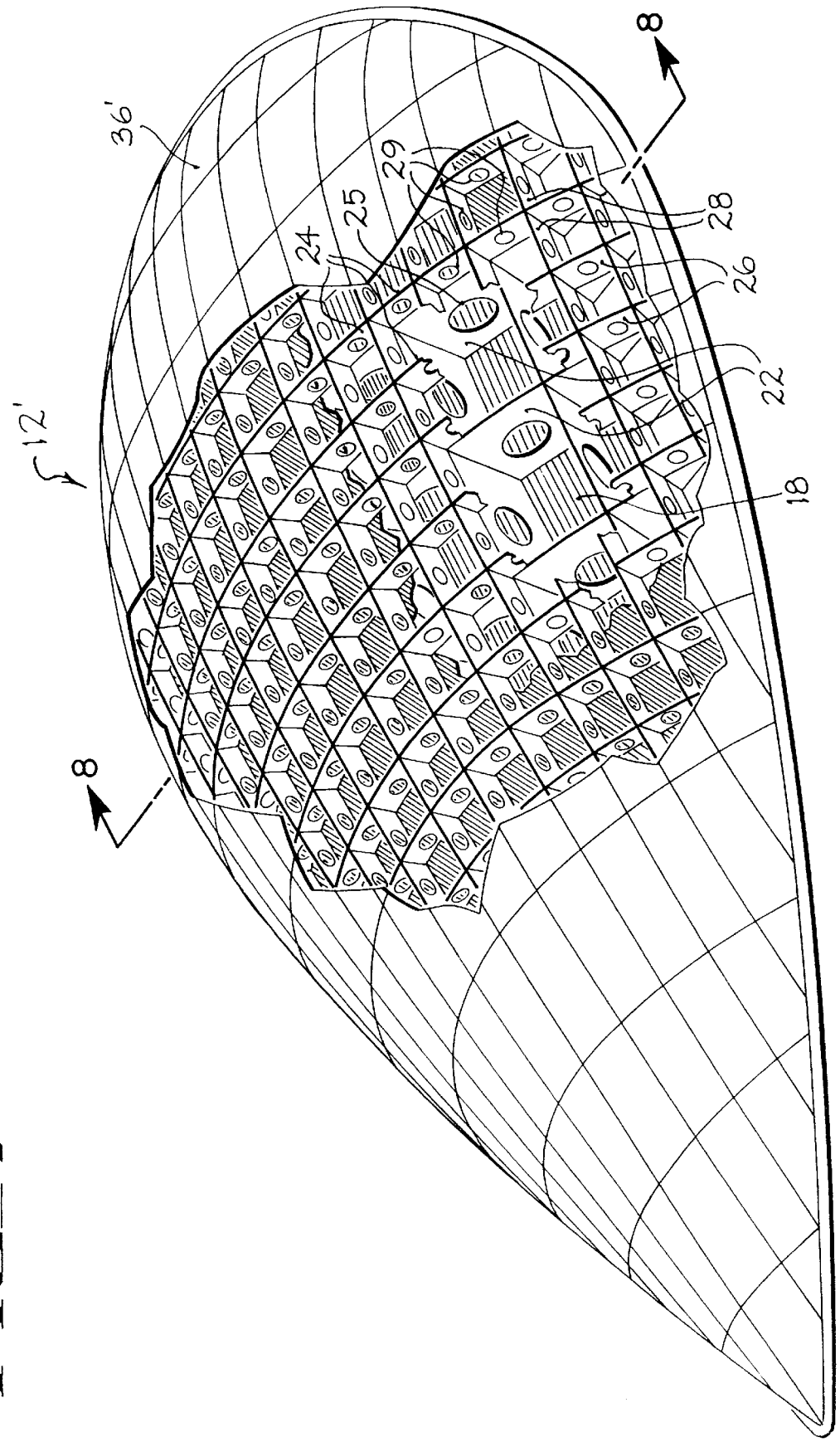
FIG_7

FIG_8
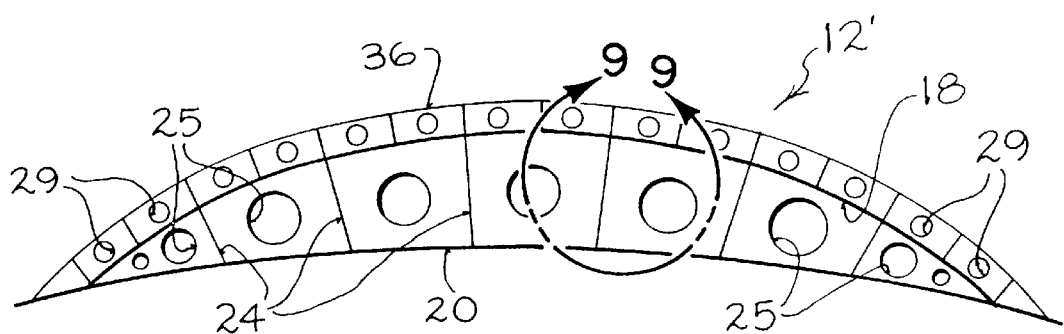
FIG_9
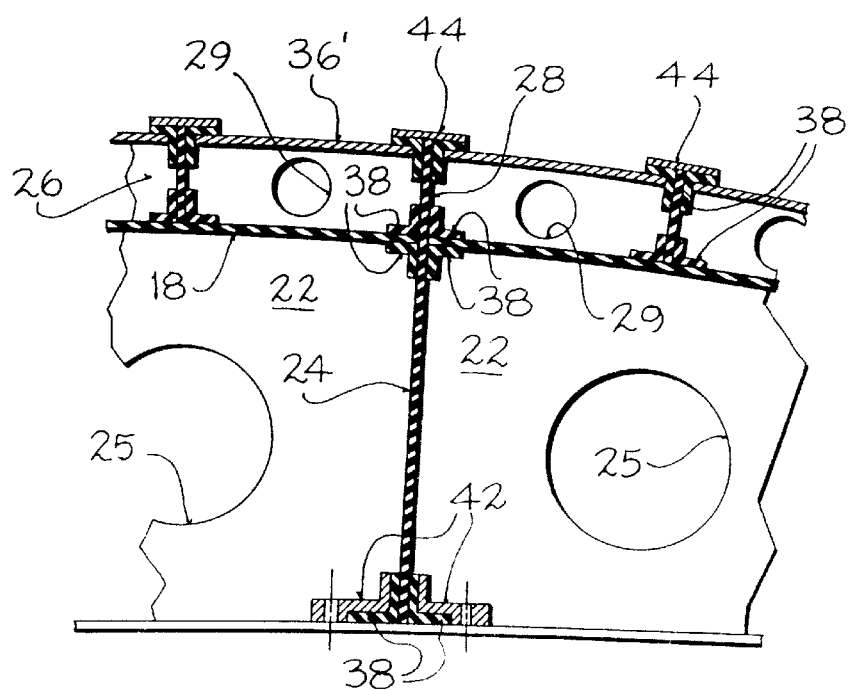

INFLATABLE CONFORMABLE FUEL TANK

SPECIFICATION

CROSS REFERENCES TO RELATED U.S. APPLICATIONS

The co-pending application Ser. No. 08/542,926, filed Oct. 13, 1995 and entitled "Fabrication Method For An Inflatable Deployable Control Structure For Aerospace vehicles", Duane Lowell Jensen inventor, is incorporated by reference in this application.

The co-pending application Ser. No. 08/542,925, filed Oct. 13, 1995 and entitled "Inflatable Deployable Control Structures For Aerospace Vehicles", Duane Lowell Jensen inventor, is also incorporated by reference in this application.

1. Technical Field

The present invention relates to inflatable, deployable, or expandable structures for aircraft that have non-circular and/or non-cylindrical cross-sectional shapes. More particularly, the present invention relates to an inflatable fuel tank for aircraft that is conformable to the fuselage of the aircraft and which exhibits good aerodynamic performance and low radar cross sectional signature characteristics.

2. Background of the Invention

For military aircraft applications, a large portion of the fuel allocated for a particular flight mission is consumed during the initial taxiing of the aircraft on the flight deck and also during the acceleration of the aircraft up to the cruise altitude. Often times, the aircraft will require an additional supply of fuel prior to arrival at the mission destination in order to ensure that the aircraft has sufficient fuel to complete the mission and to return to base.

With reference to FIG. 3, there is shown an aircraft 30 provided with under wing mounted, jettisonable fuel tanks 32 in accordance with the known prior art technique for extending the range of combat aircraft. The fuel tanks 32 are mounted to pylons 34 that are affixed to the lower surface of the wings 35. In use, the fuel tanks 32 provide the additional fuel that would be otherwise consumed prior to arrival at the mission destination. The fuel tanks 32 are then jettisoned prior to engagement.

Such under wing mounted, jettisonable fuel tanks suffer from several disadvantages. Firstly, they present a large and undesirable radar cross sectional (RCS) signature, such that the aircraft can be detected on radar more easily prior to reaching the mission destination. This is true even after the fuel tanks 32 are jettisoned, since the pylons 34 will also produce an easily detectable radar spike. A second disadvantage is the high cost associated with such additional fuel carrying systems, since the fuel tanks 32, once jettisoned, are not reusable. A third disadvantage is that the jettisoned fuel tanks pose a significant health hazard to ground personnel, which, depending on the nature of the conflict may include both civilian and military personnel. Finally, under wing mounted, jettisonable fuel tanks are not very aerodynamic and introduce undesirable drag to the aircraft.

It is known from the prior art to conform an additional rigid fuel tank to the aircraft's fuselage in order to increase range without the drag penalty associated with under wing mounted jettisonable fuel tanks. The rigid conformable fuel tanks are integrally attached to the aircraft and thus are non jettisonable. Once emptied of fuel, however, such rigid conformable fuel tanks merely add unwanted volume to the aircraft.

It would be desirable to be able to extend the flight range of the aircraft by carrying additional fuel in a conformable fuel tank and then, upon reaching the mission destination and/or consumption of the additional fuel in the conformable fuel tank, collapse the conformable fuel tank into a second stowed, aerodynamic position to reduce volume and to further improve the flight performance of the aircraft.

An inflatable, deployable conformable fuel tank for aircraft made from lightweight elastomeric fiber-reinforced materials would be desirable as it would not add significant weight to the aircraft and it could also be compactly stowed adjacent the aircraft's fuselage thereby conserving valuable payload which could be advantageously used for other purposes.

Pressure vessels made from flexible material, such as, for example, a child's balloon, naturally conform to a circular cross section when pressurized. They are usually spherical or cylindrical in geometry, but in both instances a cross section through the balloon reveals circular cross sections. Conformable fuel tanks for aircraft typically have complex cross sections, such as polyhedrons or elongated tear shaped cross sections, both of which are far different from circular or cylindrical cross sections. The problem, therefore, is how to design an inflatable fuel tank using flexible, leak proof pressure membrane material that, when pressurized, will conform to a desired aerodynamic, noncircular cross sectional fuselage conformable fuel tank shape.

Copending application Ser. Nos. 08542,926 and 08/542,925, both of which are commonly owned by the assignee of this application, disclose fabrication methods and apparatus for the manufacture of inflatable, deployable airfoils and other control structures for aerospace vehicles that comprise lightweight and easily foldable fiber-reinforced elastomeric material and that are of noncircular cross-section and leak proof.

It would be desirable to incorporate, within the fuselage of an aircraft, an inflatable conformable fuel tank which has a desired aerodynamic cross-sectional shape and which also retains the improved flexibility and foldability characteristics of the inflatable noncircular cross-section control structure of the fiber-reinforced pressure membrane material disclosed in the above two copending applications.

SUMMARY OF THE INVENTION

Briefly, in accordance with a preferred embodiment of the invention, an inflatable conformable fuel tank for aircraft is constructed to be installed at a certain location on an aircraft and to be retained at that certain location throughout the entire flight operation of the aircraft. The fuel tank assembly comprises a fiber-reinforced pressure membrane construction that is movable between a first, deployed aerodynamic configuration in which the assembly can hold a supply of liquid fuel, and a second, aerodynamic stowed configuration in which the exterior surface of the assembly conforms to a surface of the aircraft underlying the assembly. The fiber-reinforced pressure membrane construction comprises a dual chamber assembly including: a first, inner, liquid chamber for containing the liquid fuel; and a second, outer, gas chamber that at least partially envelopes the inner, liquid chamber. The outer, gas chamber is constructed to contain a pressurized volume of gas sufficient to inflate and to maintain the inflatable conformable fuel tank assembly in the deployed position, irrespective of the level of fuel contained in the inner, liquid chamber.

Once the fuel is spent or is purged from the inner, liquid chamber, the outer, gas chamber can be de-pressurized by vacuum. This causes the inflatable conformable fuel tank assembly to collapse into the stowed position such that it conforms to surface of the aircraft underlying the fuel tank assembly.

In order to obtain the desired aerodynamic noncircular cross sectional shape, the inner and outer chambers of the inflatable conformable fuel tank assembly include bidirectionally extending structural elements that are internally disposed within each chamber. In a preferred embodiment, the structural elements consist of flexible and foldable spars and bulkheads formed of fiber-reinforced elastomeric rubber material and are arranged in a generally egg crate fashion such that they divide each of the inner and outer chambers into a plurality of individual sub-chambers. The common walls of the individual sub-chambers within each inner and outer main chamber are provided with holes to permit fluid communication therebetween. The spars and bulkheads that form the walls for the individual sub-chambers of the inner, liquid chamber comprise fiberglass roving material wetted with a fuel-impervious elastomeric rubber material, such as polysulfide rubber. As the spars and bulkheads that form the walls for the individual sub-chambers of the outer, gas chamber need only form an airtight seal, they may comprise fiberglass roving material wetted by a wide range elastomeric materials, including but not limited to a number of commercially available silicone rubber compositions.

The inflatable conformable fuel tank of the present invention offers many advantages over the conventional under wing mounted, jettisonable fuel tanks of the prior art, including: a reduction in the overall drag characteristics of the aircraft; a reduction in the radar cross sectional signature of the aircraft; and significant reductions in weight and cost in view of the simple and widely available composite materials that are used to fabricate the fuel tank.

Also, unlike the jettisonable fuel tanks of the prior art, the inflatable conformable fuel tank is reusable and is capable of in-flight refueling.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric perspective view of an aircraft equipped with an inflatable conformable fuel tank of the present invention. The inflatable conformable fuel tank is shown in an aerodynamic stowed position.

FIG. 2 is an isometric perspective view similar to FIG. 1 showing the inflatable conformable fuel tank moved into an aerodynamic deployed, fully inflated position.

FIG. 3 is a isometric perspective view showing an aircraft equipped with under wing mounted, jettisonable fuel tanks in accordance with the known prior art technique for providing extended range to combat aircraft.

FIG. 4 is an enlarged isometric perspective view in partial break away of an inflatable conformable fuel tank for aircraft constructed in accordance with one embodiment of the present invention.

FIG. 5A is a side elavational view in cross section taken along the line and in the direction of arrows 5A—5A of FIG. 4.

FIG. 5B is a side elevational cross section view similar to FIG. 5A but showing the inflatable conformable fuel tank in the stowed position.

FIG. 6 is an isometric perspective view of an aircraft equipped with an inflatable conformable fuel tank constructed in accordance with a second embodiment of the present invention.

FIG. 7 is an enlarged isometric perspective view in partial break away of the inflatable conformable fuel tank shown in FIG. 6.

FIG. 8 is a cross section side elevational view taken along the line and in the direction of arrows 8—8 of FIG. 7.

FIG. 9 is an enlarged fragmentary view of the interior region of the inflatable conformable fuel tank shown encircled by double arrow 9—9 in FIG. 8.

DETAILED DESCRIPTION OF THE PREFERRED EMBODIMENTS

FIGS. 1–2 show two similar views of an aircraft 10 equipped with a deployable, inflatable conformable fuel tank of the present invention. The deployable, inflatable conformable fuel tank is designated generally at reference numeral 12 and is constructed to be movable between a first, stowed position (see FIG. 1) and a second, fully deployed position (see FIG. 2). Note that the fuel tank 12 is also constructed to be permanently attached to the aircraft and is further constructed to be aerodynamically conformable with the surrounding structure of the aircraft 10 in both the stowed and deployed positions. In the example shown and described, the fuel tank 12 is attached to and is aerodynamically conformable with the fuselage portion of the aircraft 10.

With reference to FIGS. 4, 5A and 5B, the construction and operational details of deployable conformable fuel tank constructed in accordance with a first embodiment of the invention will now be described.

The conformable fuel tank 12 comprises a flexible and compactly stowable, fiber-reinforced pressure membrane assembly which includes a first, inner liquid chamber 14 and a second, outer gas chamber 16. The inner, liquid chamber 14 is designed to hold a quantity of additional fuel for the aircraft 10. The outer, gas chamber 16 partially envelopes the inner, liquid chamber 14. In operation, the outer, gas chamber 16 is pressurized with gas to cause the fuel tank 12 to inflate into the aerodynamic deployed position as shown in FIG. 2.

It is a feature of the invention that the two chambers 14 and 16 be isolated from each other such that gas pressurization of the gas chamber 16 will maintain the fuel tank 12 in the deployed position irrespective of the level of fuel remaining in the inner, liquid chamber 14. In a preferred embodiment, a leak proof membrane 18 forms a common wall between the inner, liquid chamber 14 and the outer, gas chamber 16.

As best seen in FIG. 5A, the inner, liquid chamber 14 includes an inner surface membrane 20 that attaches to an underlying surface 22 of the aircraft. The inner, liquid chamber 14 is provided with an inner framework of foldable and flexible bidirectionally extending structural elements, namely bulkhead members 22 and spars 24, which are attached to both the common membrane 18 and to the inner surface membrane 20. Similarly, the outer, gas chamber 16 is provided with an inner framework of bidirectionally extending structural elements, namely bulkhead members 26 and spars 28, which are attached to both the common membrane 18 and to an outer surface membrane 36. In a preferred embodiment, the outer surface membrane incorporates rigid structural materials, such as metal structure or composite structure, to prevent wrinkling of the outer surface membrane when moved into the stowed position of the fuel tank assembly.

The bulkhead members 22 and spars 24 of the inner, liquid chamber 14 and the bulkhead members 26 and spars 28 of the outer, gas chamber 16 define an egg crate structural configuration which functions to position and maintain the fuel tank assembly 12 in a desired outer surface configuration when the outer, gas chamber 16 is pressurized to inflate the fuel tank assembly 12 into the deployed position.

As is readily apparent from the drawings, selected ones of the bulkhead members 22 and spars 24 of the inner, liquid chamber 14 are provided with holes 25 to permit fluid communication between adjacent subchamber regions of the inner, liquid chamber 14. The number and spacing of the bulkhead members 22 and spars 24 are selected to advantageously inhibit sloshing of fuel within the inner, liquid chamber 14.

In a similar manner, selected ones of the bulkhead members 26 and spars 28 of the outer, gas chamber 16 are provided with holes 29 to permit complete gas pressurization of the individual subchamber regions of the outer, gas chamber 16.

As previously noted, the bulkhead members 22 and spars 24 of the inner, fluid chamber 14 and the bulkhead members 26 and spars 28 of the outer, gas chamber 16 are designed to be constructed as flexible and foldable members which permit the fuel tank assembly to be collapsed into an aerodynamic stowed position once the fuel in the inner, fluid chamber 14 is depleted and the pressurized gas in the outer, gas chamber 16 is evacuated.

To this end, the bulkhead members and spars are advantageously constructed as elastomeric resin-impregnated cloth strips, such as, for example, strips of fiber glass roving material wetted with an elastomeric rubber composition as disclosed in copending applications Ser. Nos. 08/542,926 and 08/542,925.

Suitable elastomeric material for use in wetting the cloth strips which form the common membrane 18, the inner surface membrane, the bulkhead members 22 and the spars 24 of the inner, fluid chamber 14 include polysulfide rubber. Other flexible rubber materials that are impervious to aviation fuel and which exhibit good fiberglass wetting characteristics and which will withstand the interior operating pressure requirements of about 30 psi may also be used. The inner, fluid chamber 14 further includes a rigid base structure 40, preferably of metallic or composite material, which facilitates fastening directly to the underlying structure of the aircraft (not shown). Rigid attach points 42, fashioned as angle members, may be used to help secure the bulkhead members 22, spars 24 and inner surface membrane 20 to the rigid base structure 40. Additional strips of resin-impregnated cloth material 38 may be applied at the corners regions of both the inner, liquid chamber 14 and outer, gas chamber 16 to provide localized reinforcement.

In the case of the outer, gas chamber 16, the elastomeric material selected for use in wetting the cloth strips which form the bulkhead members 26 and the spars 28 need not be impervious to aviation fuel, and therefore a wider selection of known commercially available elastomeric rubber materials may be employed for this purpose. Selection of a suitable elastomeric material entails evaluation of the following characteristics: viscosity, tear strength, shear strength, tensile strength, modulus, cured stiffness and thermal properties. The selected rubber material, in combination with the cloth or fiber reinforcement, must also withstand the internal operating gas pressures of approximately 30 psi as well as the external loads that are experienced during flight. An especially suitable elastomeric rubber material for use in the present invention is the silicone rubber composition sold by Dow Corning under the trademark SYLGARD® 184 RESIN.

FIGS. 6–9 illustrate an inflatable deployable conformable fuel tank 12' constructed in accordance with a second embodiment of the present invention. Structural elements common to both embodiments are indicated by identical reference numerals.

The principle distinction between the generally rectangular shape fuel tank configuration 12 of FIGS. 1–5B and the tear drop shape fuel tank configuration 12' of FIGS. 6–9 is the shape of the individual bulkhead members and spars of both the inner, fluid chamber 14 and the outer, gas chamber 16. In the tear drop shape embodiment 12' shown in FIGS. 6–9, it is evident that the fuel tank assembly can be specially configured in a number of ways to incorporate a wide variety of complex curvatures. This is achieved by selecting varying airfoil cross sectional shapes for the bulkhead members and spars of the inner, fluid chamber 14 and outer, gas chamber 16.

With reference to FIG. 9, the outer surface membrane 36' of the tear drop shape embodiment 12' preferably comprises flexible elastomeric resin-impregnated fiberglass roving material, rather than the rigid backing support structure that is incorporated in the previously described embodiment. The flexible material selected enables the outer surface membrane 36' to conform to a desired curvature.

The number and spacing of the integral bulkhead members 26 and spars 28 will determine the amount of deviation from a perfect airfoil structure that is allowed, since the flexible skin of the outer surface membrane 36' will have a tendency to bulge outwardly at the unsupported regions overlying the subchambers of the outer, gas chamber 16. Additional resin-impregnated cloth strips 44 are applied in the lengthwise direction, ie, coordinate with the direction of airflow across the fuel tank assembly, to complete the leak proof juncture of the outer surface membrane 36' with the bulkhead members 26 and spars 28.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A method of conforming a fuel tank assembly with two different aerodynamic configurations on an aircraft, said method comprising:

constructing the assembly with a first, inner, liquid chamber for containing a supply of liquid fuel in a first, aerodynamic deployed configuration of the assembly;

constructing the assembly with a second, outer, gas chamber for containing a pressurized volume of gas in the first, aerodynamic deployed configuration of the assembly;

incorporating bidirectionally extending structural elements in said second, outer, gas chamber which are effective to hold the assembly in said first, aerodynamic deployed configuration under the force of the pressurized gas irrespective of the quantity of liquid fuel in the first, inner liquid chamber;

forming the structural elements of a foldable material so that the assembly can be conformed to a second, aerodynamic stowed configuration in which the exterior surface of the assembly conforms to a surface of the aircraft underlying the assembly;

installing the fuel tank assembly at a certain location on an aircraft;

retaining the fuel tank assembly at said certain location throughout the entire flight of the aircraft;

admitting pressurized gas to and retaining pressurized gas in the second, outer, gas chamber to conform the assembly to and to retain the assembly in said first aerodynamic deployed configuration when the first, inner liquid fuel chamber contains a supply of liquid fuel; and evacuating the pressurized gas from the second, outer, gas chamber to conform the assembly to the second, aerodynamic stowed configuration when the supply of fuel in the first, inner, liquid chamber has been depleted.

2. A conformable fuel tank assembly constructed to be installed at a certain location on an aircraft and to be retained at that certain location throughout the entire flight operation of the aircraft, said assembly comprising:

a first, aerodynamic deployed configuration in which the assembly can hold a supply of liquid fuel;

a second, aerodynamic stowed configuration in which the exterior surface of the assembly conforms to a surface of the aircraft underlying the assembly; and deployment means for deploying the conformable fuel tank assembly between said first aerodynamic deployed configuration, and the second, aerodynamic stowed configuration; and wherein said deployment means comprises:

first, inner, liquid chamber means for containing a supply of liquid fuel; and second, outer, gas chamber means which at least partially envelope said liquid chamber means and which are constructed to contain a pressurized volume of gas sufficient to maintain the fuel tank assembly in said first, aerodynamic deployed position irrespective of the quantity of fuel in said first, inner, liquid chamber means.

3. The invention defined in claim 2, which includes a common membrane that defines a common wall between the first, inner liquid chamber means and the second, outer, gas chamber means and that is leak proof to the liquid fuel.

4. The invention defined in claim 3, wherein the second, outer gas chamber means comprise an outer surface membrane and inner, bidirectionally extending structural elements which are attached to both the outer surface membrane and to the common membrane and which function to position the outer surface membrane in said first, aerodynamic deployed configuration when said second, outer gas chamber is filled with said pressurized volume of gas.

5. The invention defined in claim 4, wherein said structural elements are flexible and foldable to enable said outer surface membrane to conform to the surface of the aircraft underlying the assembly in the second, aerodynamic stowed configuration of the assembly.

6. The invention defined in claim 5, wherein the first, inner liquid chamber means comprise an inner surface membrane and bidirectional extending structural elements which are attached to both the inner surface membrane and the common membrane for assisting in positioning the outer surface membrane and which are flexible and foldable to enable the outer surface membrane to conform to the surface of the aircraft underlying the assembly in the second, aerodynamic stowed configuration of the assembly.

7. The invention defined in claim 6, wherein the outer surface membrane is a substantially planar shape in said first, aerodynamic deployed configuration.

8. The invention defined in claim 6, wherein the outer surface membrane is a complexly curved shape in said first, aerodynamic deployed configuration.

9. A conformable fuel tank assembly constructed to be installed at a certain location on an aircraft and to be retained at that certain location throughout the entire flight operation of the aircraft, said assembly comprising:

a first, aerodynamic deployed configuration in which the assembly can hold a supply of liquid fuel;

a second, aerodynamic stowed configuration in which the exterior surface of the assembly conforms to a surface of the aircraft underlying the assembly;

a pressurized deployment assembly for deploying through pressurization the conformable fuel tank assembly between said first, aerodynamic deployed configuration and the second, aerodynamic stowed configuration and wherein said pressurization deployment assembly comprises:

first, inner, liquid chamber for containing a supply of liquid fuel; and second, outer, gas chamber which at least partially envelope said liquid chamber and which are constructed to contain a pressurized volume of gas sufficient to maintain the fuel tank assembly in said first, aerodynamic deployed position irrespective of the quantity of fuel in said first, inner, liquid chamber.

10. The invention defined in claim 9, which includes a common membrane which defines a common wall between the first, inner liquid chamber and the second, outer, gas chamber and which is leak proof to the liquid fuel.

11. The invention defined in claim 10, wherein the second, outer gas chamber includes an outer surface membrane and inner, bidirectionally extending structural elements which are attached to both the outer surface membrane and to the common membrane and which function to position the outer surface membrane in said first, aerodynamic deployed configuration when said second, outer gas chamber is filled with said pressurized volume of gas.

12. The invention defined in claim 11, wherein said structural elements are flexible and foldable to enable said outer surface membrane to conform to the surface of the aircraft underlying the assembly in the second, aerodynamic stowed configuration of the assembly.

13. The invention defined in claim 12, wherein the first, inner liquid chamber comprises an inner surface membrane and bidirectional extending structural elements which are attached to both the inner surface membrane and the common membrane for assisting in positioning the outer surface membrane and which are flexible and foldable to enable the outer surface membrane to conform to the surface of the aircraft underlying the assembly in the second, aerodynamic stowed configuration of the assembly.

14. The invention defined in claim 13, wherein the outer surface membrane is a substantially planar shape in said first, aerodynamic deployed configuration.

15. The invention defined in claim 13, wherein the outer surface membrane is a complexly curved shape in said first, aerodynamic deployed configuration.

* * * * *